United States Patent
Mangrulkar et al.

(10) Patent No.: US 10,897,742 B1
(45) Date of Patent: Jan. 19, 2021

(54) DYNAMIC ADJUSTMENT OF POWER SUPPLY USING QCI

(71) Applicant: Sprint Communications Company L.P., Overland Park, KS (US)

(72) Inventors: Sandeep Padmakar Mangrulkar, Chantilly, VA (US); Yun Sung Kim, Ashburn, VA (US); Sanghoon Sung, Ashburn, VA (US); Nagi Mansour, Arlington, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/451,180

(22) Filed: Jun. 25, 2019

(51) Int. Cl.
*H04W 52/36* (2009.01)
*H04W 52/02* (2009.01)
*H04W 52/28* (2009.01)
*H04W 28/02* (2009.01)

(52) U.S. Cl.
CPC ..... *H04W 52/367* (2013.01); *H04W 28/0268* (2013.01); *H04W 28/0284* (2013.01); *H04W 52/0277* (2013.01); *H04W 52/281* (2013.01)

(58) Field of Classification Search
CPC ....... H04W 52/00–60; H04W 28/0268; H04W 28/0284; H01Q 1/246; H01Q 21/00
See application file for complete search history.

(56) References Cited

U.S. PATENT DOCUMENTS

| | | | |
|---|---|---|---|
| 8,797,969 B1* | 8/2014 | Harel | H04L 5/14 370/328 |
| 10,624,044 B1* | 4/2020 | Marupaduga | H01Q 1/246 |
| 2011/0045819 A1* | 2/2011 | Lee | H04W 24/04 455/423 |
| 2013/0337862 A1* | 12/2013 | Liu | H04W 52/04 455/522 |
| 2014/0355484 A1* | 12/2014 | Foster | H04W 16/18 370/255 |
| 2016/0080046 A1* | 3/2016 | You | H01Q 21/28 375/267 |
| 2016/0212643 A1* | 7/2016 | Park | H04L 5/0048 |
| 2018/0227919 A1* | 8/2018 | Lee | H04L 5/0032 |

\* cited by examiner

*Primary Examiner* — Raymond S Dean

(57) ABSTRACT

Methods and systems are provided for dynamically adjusting the power supplied to an antenna system. The dynamic adjustment of power is based on a total load of an antenna system and a quality of service class identifier (QCI) value. When the total load and the load of the QCI value identifier (e.g., QCI-1) are below a predefined threshold, the power supply to the antenna system can be adjusted. The adjustment can be a complete shut-down of the entire power supply. The adjustment can be a gradual reduction in the power supply provided to the antenna system. The power supply may be adjusted with respect to the entire antenna system, an antenna array of the antenna system, a node of the antenna array, an antenna element of the node, and the like.

19 Claims, 7 Drawing Sheets

DYNAMIC ADJUSTMENT OF POWER SUPPLY USING QCI

SUMMARY

The present disclosure is directed, in part, to dynamic adjustment of a power supply to an antenna system based on a total load of the antenna system and a quality of service channel indicator (QCI) value. The antenna system can comprise one or more antenna arrays, substantially as shown in and/or described in connection with at least one of the figures, and as set forth more completely in the claims.

In aspects set forth herein, a power supply to an antenna array, nodes of an antenna array, or a plurality of antenna elements in a node of an array may be individually and dynamically controlled in order to conserve energy expenditure of an antenna system.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
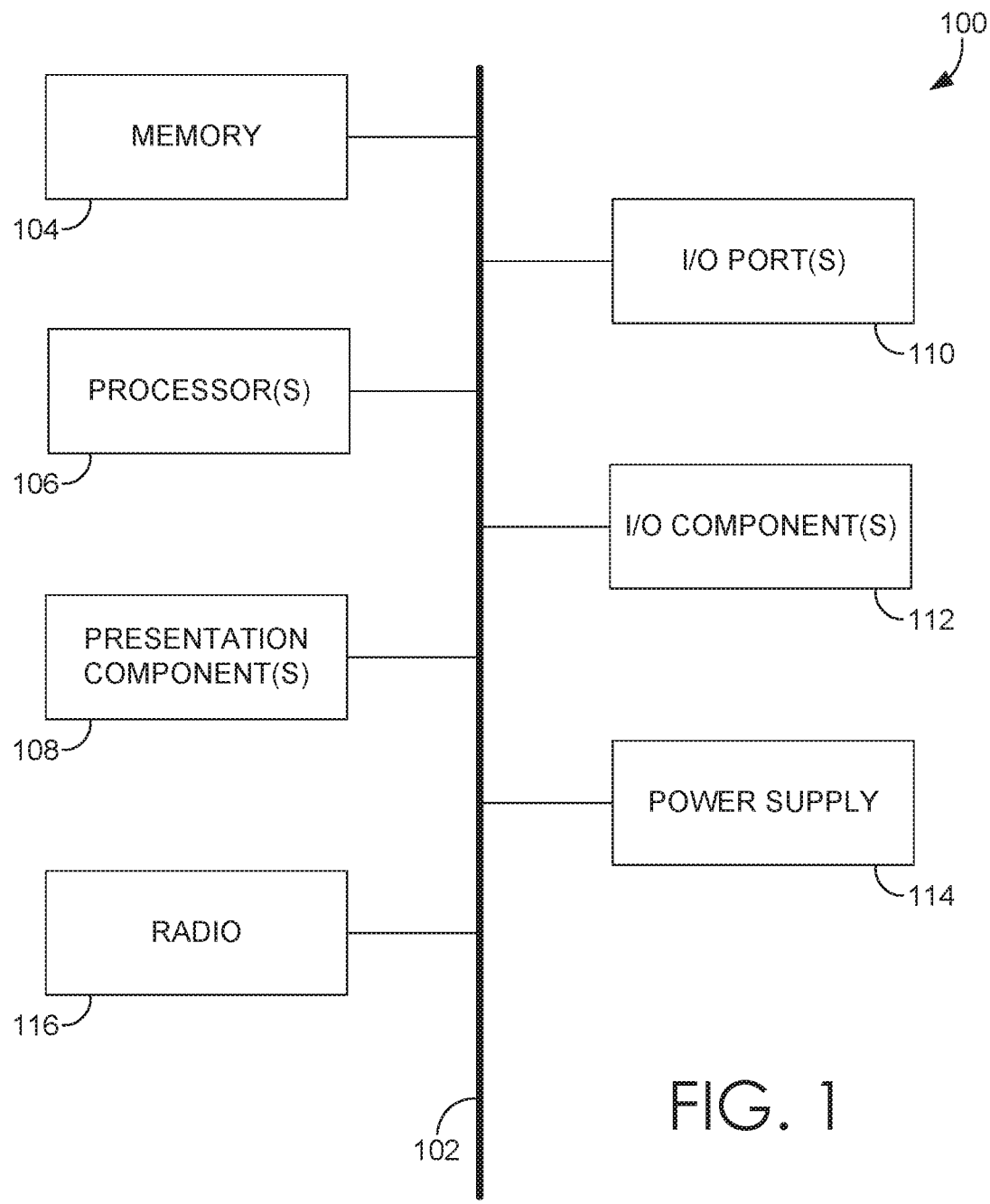
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
QoS Quality of Service
QCI QoS Class Identifier
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, $31^{st}$ Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (e.g., cell sites, cell towers) to provide network coverage. The base stations are employed to broadcast and transmit transmissions to user devices of the telecommunications network. Many factors can affect the exchange of wireless signals between a base station and a user device, referred to herein as user equipment (UE). Those factors can include the protocol used to communicate, the carrier band frequency, and the output power of transmitted signals. In particular, the power supplied to a base station or the nodes of a base station are positively correlated with increased throughput as a higher signal strength improves SINR and channel quality. However, power supplies to a node are limited by equipment specifications, often limited to no more than 160 W total output power.

Furthermore, power emitted is often times either full power or no power. The decisions to reduce the power output to no power are sometimes based solely on a total load of an antenna system. However, a total load is not a true reflection of the needed power output and basing power supply decision on this exclusively results in decreased service to the user and inefficient uses of the equipment. The present technology describes utilizing QCI values as a component to evaluate energy savings and, thus, adjustment of a power supply.

Generally, antenna arrays located at a base station, transmit or receive signals according to a protocol. An example of this is a 4G base station that uses one or more eNodeBs to wirelessly communicate with user equipment (UE) according to the 4G protocol. In another example, a 5G base station may use one or more gNodeBs to wirelessly communicate with user equipment according to the 5G standard. The development and deployment of 5G presents a variety of technical problems. One of the problems is that a significant number of current and legacy devices are capable of wirelessly communicating with a telecommunications network using 4G but are not technically capable of communicating using 5G. Compounding this problem, many 5G base stations are not capable of backward compatibility with 4G, that is, a 5G base station may not transmit or receive according to the 4G protocol. These pair of technical problems mean that in order to transition from a 4G network to a 5G network, wireless communication carriers may be required to deploy both 4G and 5G base stations, increasing network complexity, increasing total power consumption, and requiring approximately twice as much real estate (requiring expensive leases and time-consuming and expensive installations). Energy conservation will be critical in these situations.

Accordingly, in a first aspect of the present disclosure, an embodiment is directed to a system for dynamic power allocation of an antenna system. The system may comprise one or more antenna arrays; a first power amplifier coupled to at least a first antenna element of a first antenna array, where the first power amplifier provides a first power supply to the first antenna element; and a processor. The processor may be configured to execute operations comprising determining, based on a load of at least one QCI value, that the first power supply should be modified, and modifying the first power supply in response to the determination.

In a second aspect of the present disclosure, an embodiment is directed to a method for dynamically allocating power in an antenna system. The method comprises determining a maximum supply power available to the antenna system by a power supply component, wherein the antenna system comprises at least one antenna array comprising a first node and a second node, and wherein the first node and second node comprise a plurality of antenna elements; identifying a total load of the at least one antenna array of the antenna system; determining that the total load of the at least one antenna array is below a first predetermined threshold; upon determining that the total load of the at least one antenna array is below the first predetermined threshold, determining whether a load of a quality of service class identifier (QCI) value is below a second predetermined threshold; upon determining that the load of the QCI value is below the second predetermined threshold, determining that a power supply to the at least one antenna array should be modified; and dynamically modifying the power supply to the at least one antenna array.

In another aspect, an embodiment of the present disclosure is directed to a method for dynamically allocating power in an antenna system. The method comprises determining that a load of a quality of service (QoS) class identifier (QCI) value for at least one antenna array of the antenna system is below a first predetermined threshold; upon determining that the load of the QCI value is below the first predetermined threshold, determining that a power supply to the at least one antenna array should be modified; dynamically modifying the power supply to the at least one antenna array by a first predetermined level, wherein the first predetermined level is less than a maximum power supply available to the antenna system; upon expiration of a predetermined time period, identifying an updated load of the QCI value; determining that the updated load of the QCI value is below the first predetermined threshold; and dynamically modifying the power supply to the at least one antenna array by a second predetermined level, wherein the second predetermined level is less than the maximum power supply available to the antenna system.

In yet another aspect of the present disclosure, an embodiment is directed to a non-transitory computer storage media storing computer-usable instructions that, when used by one or more processors cause the one or more processors to determine that a load of a quality of service (QoS) class identifier (QCI) value for at least one antenna array of the antenna system is below a first predetermined threshold; upon determining that the load of the QCI value is below the first predetermined threshold, determine that a power supply to the at least one antenna array should be modified; dynamically modify the power supply to the at least one antenna array by a first predetermined level, wherein the first predetermined level is less than a maximum power supply available to the antenna system; upon expiration of a predetermined time period, identify an updated load of the QCI value; determine that the updated load of the QCI value is below the first predetermined threshold; and dynamically modify the power supply to the at least one antenna array by a second predetermined level, wherein the second predetermined level is less than the maximum power supply available to the antenna system.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
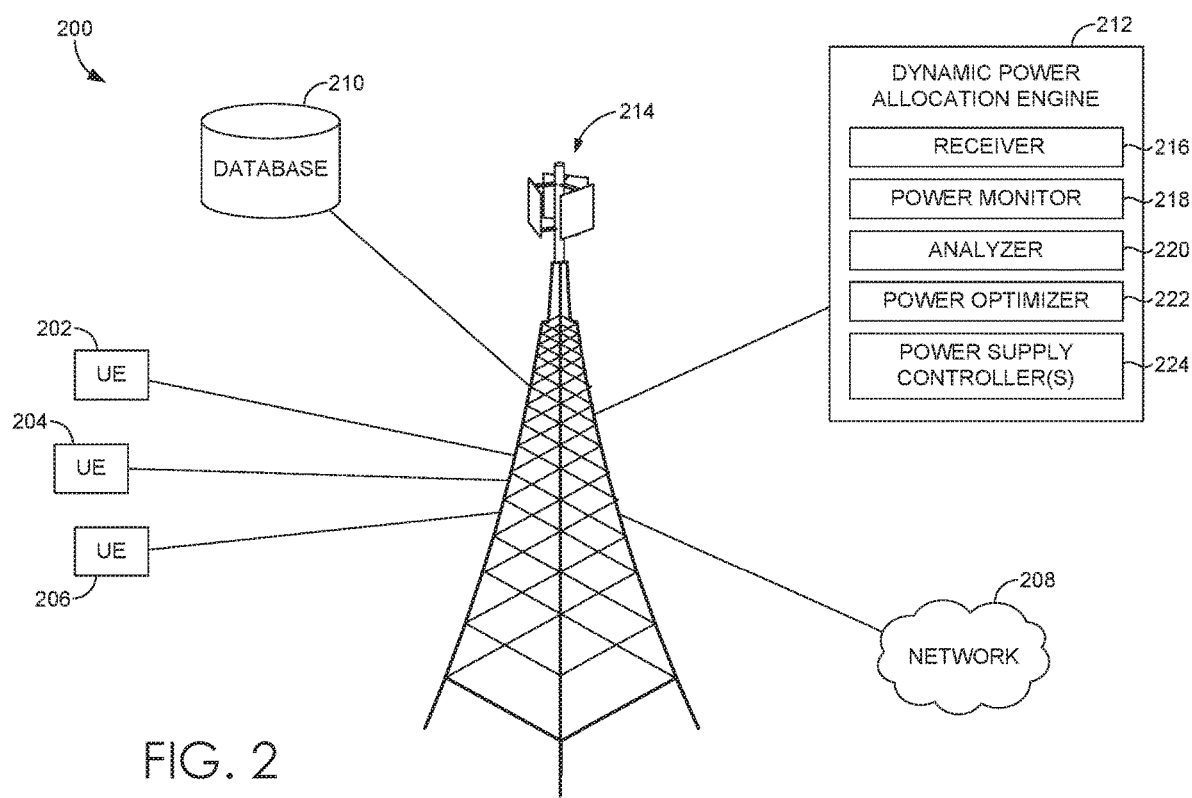
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), cell site 214, network 208, database 210, and dynamic power allocation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through cell site 214 using any one of a plurality of protocols, such as 3G, 4G/LTE, 5G and other related protocols. The network 208 may be a telecommunication network(s), or a portion thereof. A telecommunication network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., 5G and LTE) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, cell site 214 is configured to communicate with user devices, such as user devices 202, 204, and 206 that are located within the geographical area, or cell, covered by radio antennas of cell site 214. Cell site 214 may include one or more base stations, base transmitter stations, radios, antennas, antenna arrays, power amplifiers, transmitters/receivers, digital signal processors, control electronics, GPS equipment, and the like.

As shown, cell site 214 is in communication with dynamic power allocation engine 212, which comprises various components that are utilized, in various implementations, to perform one or more methods for dynamically allocating power in an antenna system. In some implementations, dynamic power allocation engine 212 comprises components including a receiver 216, a power monitor 218, an analyzer 220, a power optimizer 222, and one or more power supply controllers 224. However, in other implementations, more or less components than those shown in FIG. 2 may be utilized to carry out aspects of the invention described herein. Each of the components or sub components of the dynamic power allocation engine 212 may be a stand-alone or combined processor, server, or other computer processing component that is suitably configured to perform the operations described herein.

The receiver 216 of the dynamic power allocation engine 212 is generally responsible for receiving information from user devices that is relevant to making power allocation determinations. The receiver 216 may receive one or more uplink signals, such as a sounding reference signal, from each of a plurality of user devices. In aspects, the one or more uplink signals may provide information to the dynamic power allocation engine 212 comprising a location of the user device, such as an absolute position (e.g., latitude and longitude as determined by triangulation, GPS, or any other similar means), or a relative position (e.g., a range or distance between the cell site 214 and the transmitting user device. The one or more uplink signals may also comprise information relating to call or channel quality. Said information may comprise information regarding call failures, call drops, SINR, RSRP, or the like. Said information may comprise a QCI value. A QCI value is a scalar that is used within a network as a reference to specific parameters that control packet forwarding treatment. The QCI value indicates an activity of the UE such as a voice call (QCI-1), non-conversational video (i.e., QCI-3), real-time gaming (i.e., QCI-4), conversational video (i.e., QCI-2), and the like. An example QCI value chart is provided below for reference.

| QCI | Priority | Example Service |
| --- | --- | --- |
| 1 | 2 | Conversational voice (VoIP) |
| 2 | 4 | Conversational video (live streaming) |
| 3 | 5 | Non-Conversational video (buffered streaming) |
| 4 | 3 | Real-time gaming |
| 5 | 1 | IMS signaling |
| 6 | 7 | Voice, Video (live streaming), interactive gaming |
| 7 | 6 | Video streaming (buffered streaming) |

The receiver 216 may compile and/or decode the information received from the one or more user devices and provide user device location information, QCI values, and/or call or channel quality information to any one or more other components of the dynamic power allocation engine 212.

The power monitor 218 of the dynamic power allocation engine 212 is generally responsible for monitoring the power output of the antenna array at the cell site 214. The power monitor may be communicatively coupled to any one or more components of the cell site in order to determine how much power is presently supplied (or maximally supplied) to the antenna array, each of the one or more nodes, and/or to each individual antenna element. For example, the power monitor 218 may determine that a single radio supplying power to a single antenna array is presently supplying 160 W to the antenna array, which is the maximum capable by the radio. The power monitor 218 may further determine that 120 W are presently supplied to a first node of the antenna array and that 40 W are presently supplied to a second node of the antenna array. The power monitor 218 may also determine that 1.2 W are being supplied to each of 32 transmit elements of the second node. In aspects, the power monitor 218 may be communicatively coupled via a hardwire/physical link or via a wireless connection, such as Bluetooth, NFC, 802.11, or any other suitable wireless link. The power monitor may associate the amount of power presently supplied (or maximally supplied) with the monitored radio/node/element and pass the information to any one or more other components of the dynamic power allocation engine 212, such as the analyzer 220.

The analyzer 220 is generally responsible for making power allocation determinations based on present network conditions, maximum available output power, total load, and a load of any QCI values identified from or associated with, for instance, UEs. The analyzer 220 may receive user device location and one or more QCI values from the one or more user devices and determine any one or more power allocation factors, comprising any one or more of total load of the antenna system (also referred to herein as device penetration), a total load of any QCI value identified, call failure rate, and connection drop rate (per protocol). As used herein, total load, or device penetration, refers to the number of user devices connected to or served by an antenna system having one or more antenna arrays using at least a first wireless communication protocol (e.g., 3G, 4G/LTE, 5G) to communicate with any one or more user devices. Call failure rate may be a proportion, percentage, or simple number of call failures experienced by any one or more user devices in an attempt to connect to the first node of the antenna array, wherein the term "call failure" is used herein to mean an unsuccessful attempt by a user device to initiate a wireless communication session with the network or another user device. The dropped call factor may also be a rate, proportion, percentage, or simple number of connection drops experienced by any one or more user devices in communication with the first node, wherein the term "connection drop" is used herein to describe the undesirable termination of a previously-established wireless communication session. Though the terms "call failure" and "connection drop" may suggest application to voice calls, the terms, as used herein, are also used to describe data or other non-voice communication sessions. Both the call failure and connection drop factors may be said to occur within some time period, such as 5 minutes, an hour, several hours, one day, or several days, or at any other periodicity.

Figure 4:
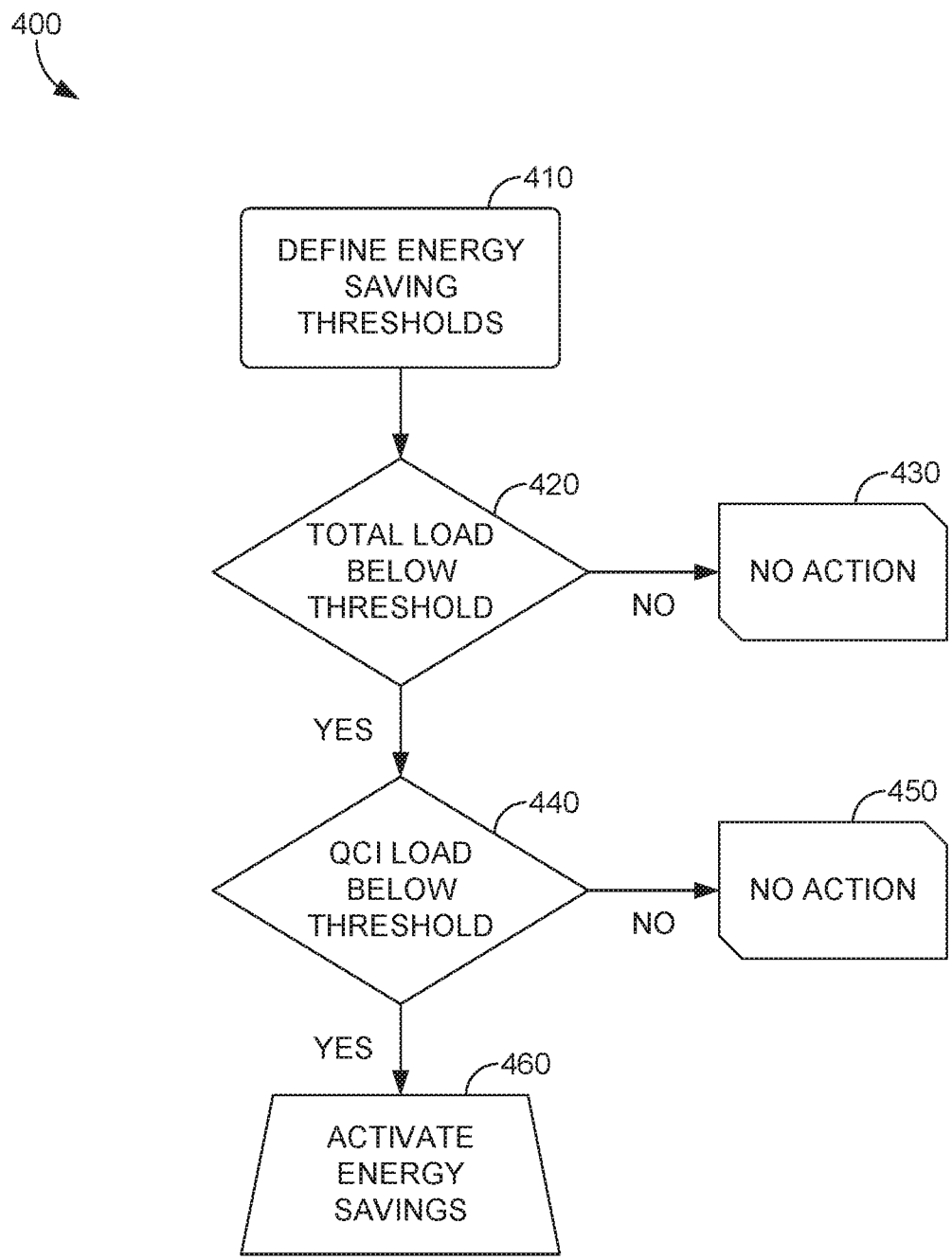
FIG. 4 depicts a flow diagram of an exemplary method for dynamically adjusting a power supply of an antenna system in accordance with aspects herein.

The analyzer 220 may compare said information to the power presently and/or maximally supplied to the various hardware components, as determined by the power monitor 218. The analyzer 220 may include instructions/logic controlling how the information received is processed. Exemplary analyzer intelligence is depicted in the flow diagram 400 of FIG. 4. Initially, energy savings thresholds are defined at block 410. Energy savings thresholds can be configurable and dynamic (i.e., the thresholds can be changed at any time by an administrator). With defined thresholds, the analyzer 220 can evaluate the total load and a load of each QCI value detected to determine when to activate energy savings measures. As shown in FIG. 4, the analyzer 220 evaluates whether a total load is below a predetermined total load threshold at block 420. If not, no action is taken and the method proceeds to block 430. In an embodiment, a total load is below the predetermined threshold when the total load of a cell site is less than 40% of maximum capacity. If the total load is determined to be below the predetermined QCI value threshold, the method proceeds to block 440 where the analyzer 220 determines whether the QCI value load (for any QCI values detected or for a highest prioritized QCI value (discussed hereinafter)) is below the predetermined QCI value threshold. If not, the method proceeds to block 450 and no action is taken. If yes, energy savings measures are activated at block 460 (i.e., power supply to the cell site 214 is reduced).

By way of example, the analyzer 220 may receive information from the power monitor 218 that a first node of the antenna array is presently supplied with 80 W, and that a second node of the antenna array is also presently supplied with 80 W. The analyzer 220 can also receive information from the receiver 216 regarding the total load of the cell site 214. For exemplary purposes, assume that the total load received in this example is 10% of the maximum load capacity and is below the predetermined total load threshold. The analyzer 220 can also receive information from the receiver 216 that 75% of user devices presently served by the antenna array and communicating with the cell site 214 are associated with a QCI-1 value. In this example, 75% likely does not fall below a predetermined QCI value threshold. Thus, power would not likely be reduced since both the total load and the QCI value load are not below the predetermined thresholds.

The analyzer 220 can be configured in many different ways. For instance, the predetermined QCI value threshold may be evaluated on a per-QCI value basis. In other words, the analyzer 220 may be configured to determine that the QCI values are below the predetermined QCI value threshold if any (but not all) QCI values are below the threshold. Thus, the analyzer 220 can identify that certain QCI values are below the threshold while other QCI values are not below the threshold. In that instance, the analyzer 220 can rely on priority values for each QCI value. For instance, as shown in the chart above, voice calls (QCI-1) can be prioritized above non-conversational video (QCI-3). Assume that in an example the QCI-3 values may be below a threshold while the QCI-1 values are not below the threshold. The analyzer 220 can identify that a higher prioritized QCI value exceeds the threshold so as not to activate energy savings even though a QCI value is below the threshold. The weights may be configured according to user preference. In embodiments, the weights/priority values correspond to the priority levels of the above-noted chart. In embodiments, voice calls (QCI-1) have a higher priority than any other QCI value. As such, QCI-1 values may have a lower predetermined threshold than any other QCI values such that the QCI-1 value needs to be much lower in order to be lower than its threshold. For example, a QCI-1 value threshold may be 10% where anything 11% or higher would not be below the threshold and, thus, would not activate energy savings measures. However, a different QCI value may have a threshold of 25% such that anything 26% or higher would not be below the threshold, thus having a higher likelihood of satisfying the energy savings threshold requirements.

In additional embodiments, the analyzer 220 can identify that a QCI value associated with, for example, a first node of an antenna array is below the threshold while a QCI value associated with a second node of an antenna array is above the threshold. In that instance, the analyzer 220 can intelligently determine to activate energy savings measures (e.g., reduce the power) with respect to portions of the antenna system such as, for instance, an antenna array of the antenna system, a node of the antenna array, an antenna element of the node, and the like. Thus, the energy savings measures can be customized and may vary within a single antenna system. That is, power to the entire antenna system can be uniformly reduced or power to portions of the antenna system can be reduced while other portions of the antenna system remain unaffected.

Based on the above-described analysis, the analyzer 220 may determine that the power to any portion of the antenna system should be decreased. The analyzer 220 may provide said determination to the power optimizer 222. The power optimizer 222 can determine how much power should be supplied to or reduced from any portion of the antenna system based on the one or more determinations made by the analyzer 220. The power optimizer 222 can continually determine how much power should be supplied to the antenna system and provide instructions to the power supply controllers 224. The power optimizer 222 may make said determination at some frequency (e.g., every 5 minutes, 15 minutes, one hour, one day, or the like), or it may make said determination upon the analyzer 220 determining that the total load and the QCI value thresholds are not being met (e.g., the values for the total load and the QCI values are below an operator-set threshold, such as 50%, 40%, 30%, 20%, 10%, or the like).

In some aspects, the dynamic power allocation engine 212 uses an iterative process to dynamically allocate the power to the antenna elements or nodes of the antenna array. That is, upon the analyzer 220 determining that the power supplied to the antenna system should be modified, the power optimizer 222 may determine to initiate a stepped power change. For example, assuming that both a total load of the antenna system and the QCI value (assume a single value for simplicity) are below predefined thresholds, the power optimizer 222 may decrease power to the antenna system by some amount (e.g., 5 W). The dynamic power allocation engine 212 can wait a predetermined period of time (e.g., 5 min, 30 min, etc.) to re-evaluate the load values (i.e., total load and QCI value loads) to identify if the power supply should continue to be decreased, stay the same, or be increased. In embodiments, if there is no change in the updated load determinations from the previous load determinations, the analyzer 220 can determine to maintain the current power supply. If the updated load determinations increase such that they no longer fall below a threshold, the power supply can be increased and restored to a previous level. If the updated load determinations are lower than the previous load determinations, the power supply can be further reduced. Thus, upon determining that the total load and QCI values load are below a threshold, the dynamic power allocation engine 212 can step-down the reduction in power rather than immediately reducing the power supply to 0%. The stepped allocation process can be iteratively performed per custom configurations. For example, the stepped allocation process can continue to be performed so long as there is a change in an updated load determination from a previous load determination. In embodiments, if there is no change in the updated load determination from the previous load determination, the dynamic power allocation engine 212 may refrain from obtaining additional load values for a predetermined rest time. For instance, if no change, the dynamic power allocation engine 212 may not obtain additional load values until the expiration of a predetermined rest time.

Regardless of the basis of the power optimizing determination, the power optimizer 222 may output power supply instructions to the one or more power supply controllers 224 (e.g., increase the first node supply power by an amount and decrease the second node supply power by the amount). The power supply controller 224 is generally responsible for adjusting the one or more power supplies as determined by the power optimizer. The power supply controller 224 may modify the phase and/or the amplitude of the power supply to any one or more nodes or antenna elements of the antenna array of the cell site 214. In aspects, the one or more power supply controllers 224 may be a radio, remote radio head, integrated radio, power amplifier, or the like.

Figure 3A:
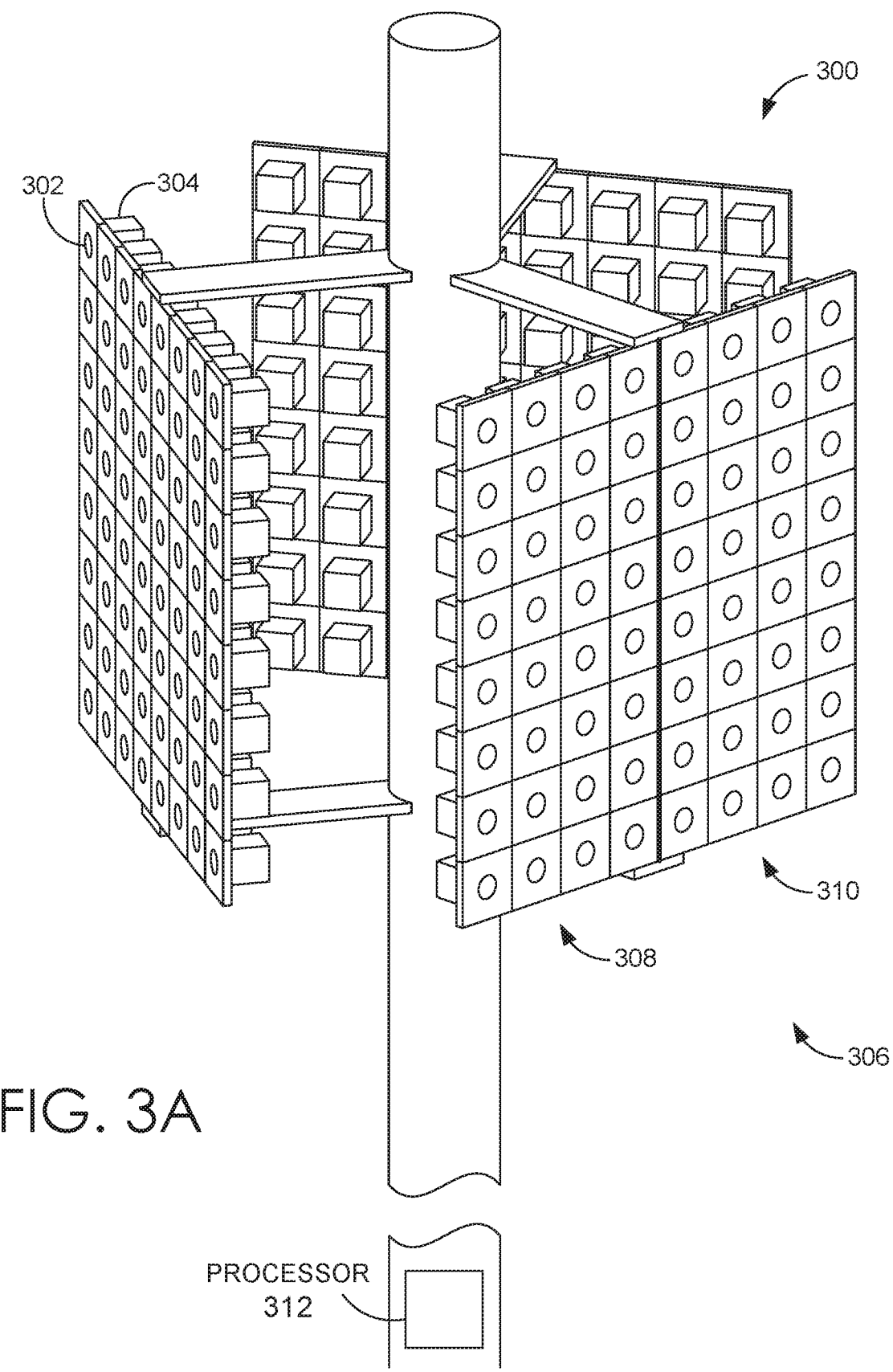
FIGS. 3A-3B each depict a graphical representation of base station configurations suitable for use in embodiments of the present disclosure.

Turning now to FIG. 3A, an exemplary base station configuration suitable for use in implementing embodiments of the present disclosure is illustrated and designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

Base station 300 comprises at least a first antenna array 306, the first antenna array 306 having one or more antennas 302. In aspects, the one or more antennas 302 may be dipole antennas, having a length, for example, of ¼, ½, 1, or 1½ wavelength. In aspects, the antenna array may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz 30 GHz.

By way of a non-limiting example, the antenna array 306 may comprise 64 antennas 302 arranged in an 8×8 structure. In other aspects, the antenna array 306 may comprise antennas arranged in an 8×4, 4×8, or 4×4 configuration. Each antenna 302 of the first antenna array 306 comprises a dedicated power supply 304. The power supply 304 supplies power having a certain phase and amplitude to antenna 302. In an embodiment, the power supply comprises a power amplifier. In other aspects, the power supply may additionally comprise a processor for making power supply determinations based on any one or more factors, consistent with this disclosure. Each power supply 304 may have a maximum power supply to each antenna 302, wherein the power supply 304 cannot supply more than a certain amount of power to the antenna 302. In aspects, the maximum per-antenna supply power may be 2.5 W, 3.5 W, 4 W, 5 W, or more.

In aspects, the first antenna array 306 may comprise a first node 308 and a second node 310. The first node 308 and the second node 310 may each communicate with one or more user devices according to a distinct protocol (i.e., the first node is configured to communicate with UE according to a first wireless communication protocol and the second node is configured to communicate with UE according to a second wireless communication protocol). By way of non-limiting example, each of the first protocol and the second protocol may comprise 3G, 4G, LTE, 5G, 802.11, or any other operator-elected wireless communication protocol standard.

The base station 300 may further comprise a processor 312. The processor 312 may be any one or more processors, servers, computer processing components, or the like, wherein the processor 312 is configured to perform any one or more operations of the dynamic power allocation engine 212 of FIG. 2. In some aspects, the processor 312 may be communicatively coupled to each of the first node 308 and the second node 310, and/or to each antenna 302 of the first node 308 and the second node 310. As discussed with respect to the dynamic power allocation engine 212 of FIG. 2, the processor 312 of FIG. 3A may make power control/allocation decisions based on a total load of the base station and the QCI values associated with UEs in communication with the base station.

Figure 3B:
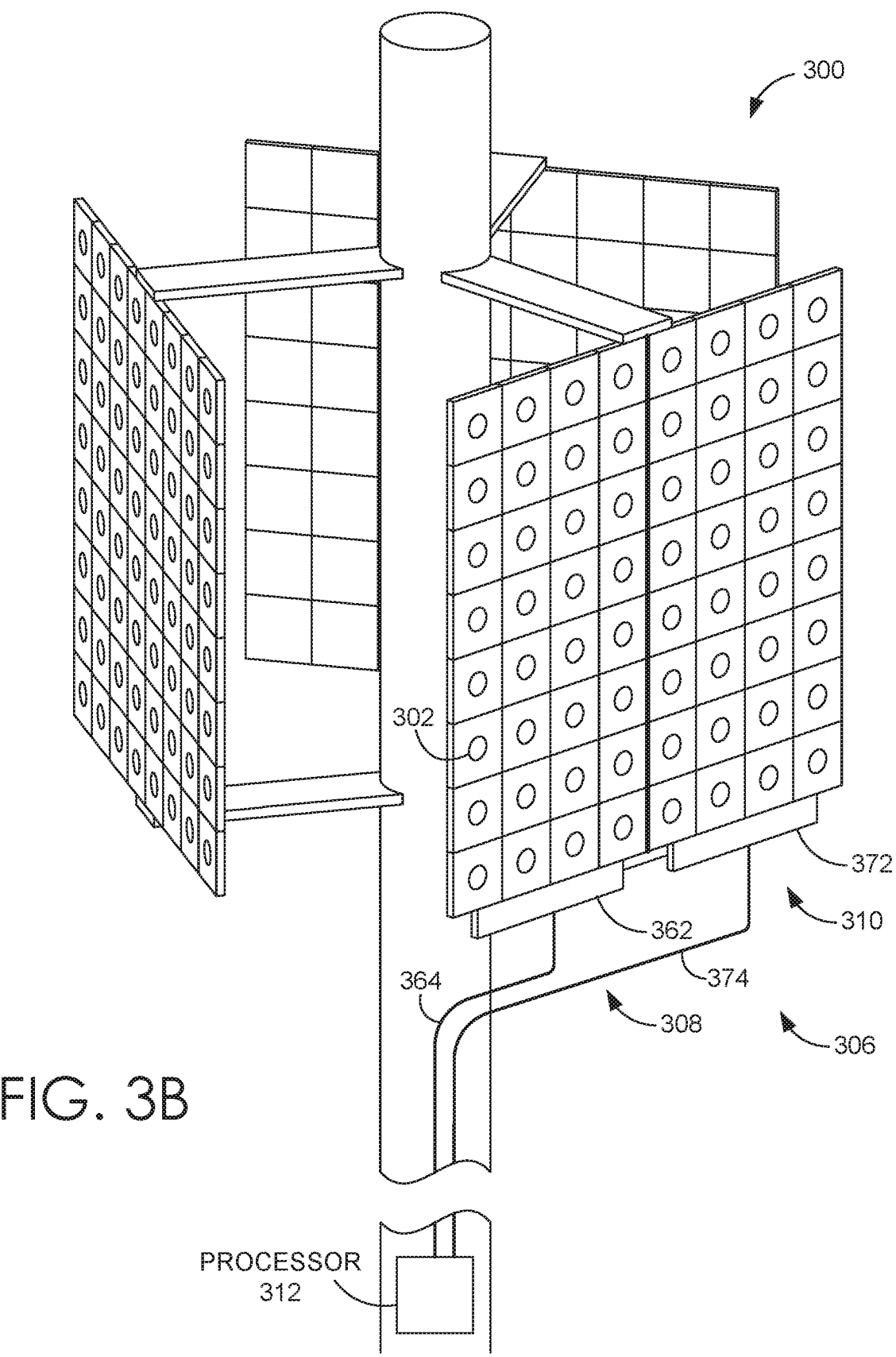

Turning now to FIG. 3B, an alternative embodiment of the base station 300 is illustrated. In aspects, instead of, or in addition to, a power supply 304 being dedicated to each antenna element 302, the first node 308 may be supplied with a first node power controller 362 and the second node 310 may be supplied with a second power controller 372. In such aspects, each of the first node power controller 362 and the second node power controller 372 may control the flow of power to each antenna element 302 or to the plurality of power supplies 304. In some aspects, the first node power controller 362 may be connected to the processor 312 via a first connection 364 and the second node power controller 372 may be connected to the processor via a second connection 374. In such aspects, the processor may comprise a radio and use each of the first connection 364 and the second connection 374 to supply power to the first node power controller 362 and the second node power controller 372, respectively. As is apparent from the different depictions of FIG. 3A and FIG. 3B, the dynamic power allocation engine 212 can be configured to adjust/modify a power supply to any portion of the antenna system independently of another portion of the antenna system (e.g., reduced power supply to a first node while maintaining a current power supply to a second node).

Figure 5:
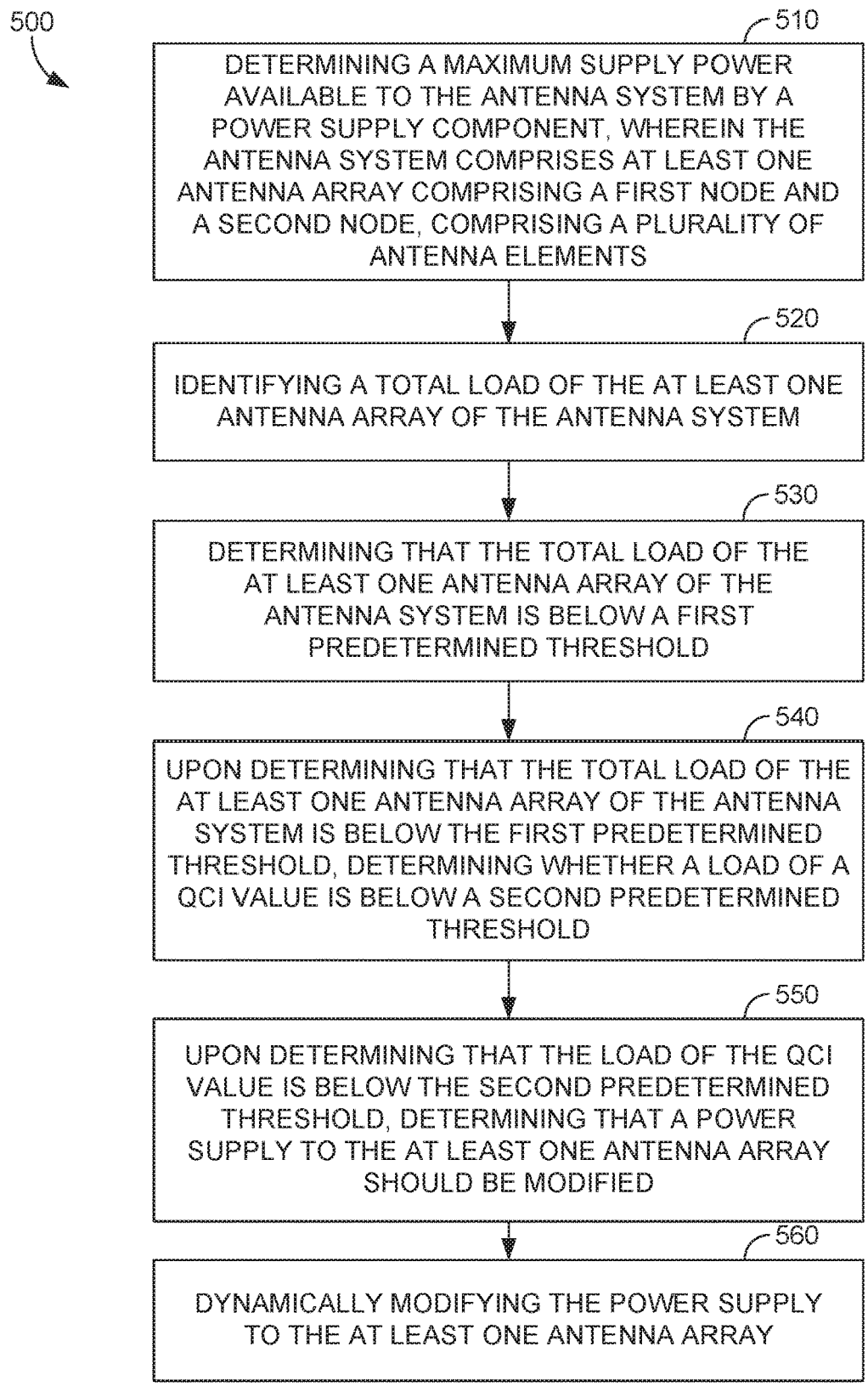
FIG. 5 depicts a flow diagram of an exemplary method for dynamically adjusting a power supply of an antenna system in accordance with aspects herein.

Turning now to FIG. 5, a flow diagram is illustrated of an exemplary method 500 for dynamically varying one or more power supplies to an antenna system based on at least one factor, in accordance with implementations of the present disclosure. Initially at block 510, a maximum power supply available to an antenna system is determined. As described above, the antenna system may comprise at least one antenna array having at least two nodes (a first node and a second node), wherein the maximum power supply to the antenna system is the maximum aggregate power supply to every node of the antenna system. In aspects, the maximum power supply to the antenna system is determined by determining the technical and/or hardware characteristics of one or more power supply components and antenna elements or nodes of the antenna system. For example, a power supply component may be technically capable of a total output power of 160 W but the total combined maximum power of the nodes and/or the antenna elements of the antenna system may be limited to 150 W. In some aspects the maximum power supply to an antenna system may be 120 W, 160 W or 200 W.

At block 520, a total load of the at least one antenna array of the antenna system is identified. It is then determined that the total load of the at least one antenna array of the antenna system is below a first predetermined threshold at block 530. Upon determining that the total load of the at least one antenna array of the antenna system is below the first predetermined threshold, it is determined whether a load of a QCI value is below a second predetermined threshold at block 540. At block 550, it is determined that a power supply to the at least one antenna array should be modified. The power supply to the at least one antenna array is dynamically modified at block 560.

Figure 6:
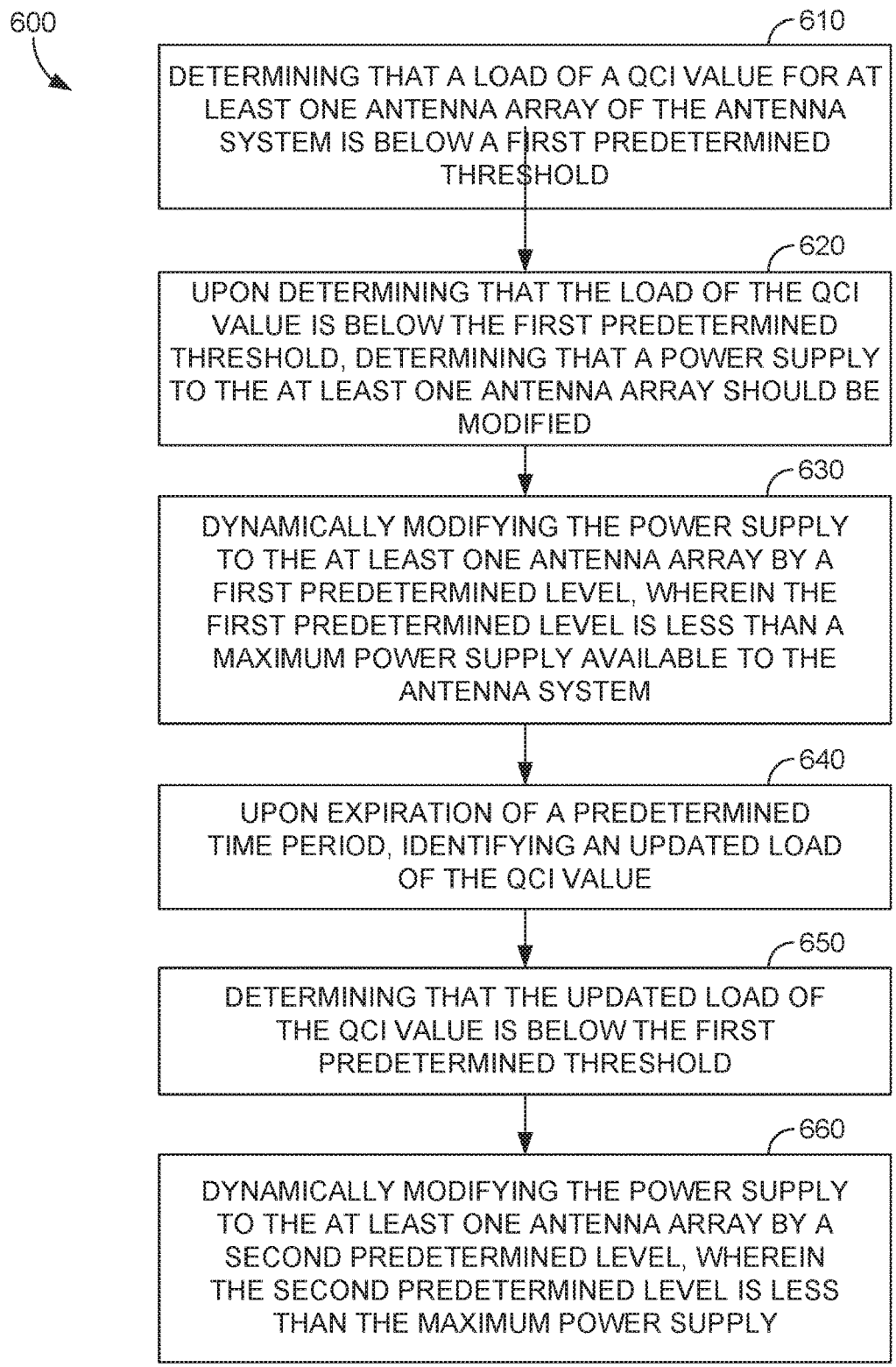
FIG. 6 depicts a flow diagram of an exemplary method for dynamically adjusting a power supply of an antenna system in accordance with aspects herein.

Turning now to FIG. 6, a flow diagram is illustrated of an exemplary method 600 for dynamically varying one or more power supplies to an antenna system, in accordance with implementations of the present disclosure. Initially, at block 610, it is determined that a load of a QCI value for at least one antenna array of an antenna system is below a first predetermined threshold. Upon determining that the load of the QCI value is below the first predetermined threshold, it is determined that a power supply to the at least one antenna array should be modified at block 620. The power supply is modified at block 630 by a first predetermined level, wherein the first predetermined level is less than a maximum power supply available to the antenna system. Upon expiration of a predetermined time period, an updated load of the QCI value is identified at block 640. It is then determined that the updated load of the QCI value is below the first predetermined threshold at block 650. The power supply to the at least one antenna array by a second predetermined level is dynamically modified at block 660, wherein the second predetermined level is less than the maximum power supply.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamic power allocation of an antenna system, the system comprising:
   one or more antenna arrays;
   a first power amplifier coupled to at least a first antenna element of a first antenna array, the first power amplifier providing a first power supply to the first antenna element; and
   a processor configured to execute operations comprising:
      determining that a total load of the one or more antenna arrays is below a first predetermined threshold;
      upon determining that the total load of the one or more antenna arrays is below the first predetermined threshold, determining whether a load of a first quality of service class identifier (QCI) value is below a second predetermined threshold;

upon determining that the a load of the first QCI value is below the second predetermined threshold, determining that the first power supply should be modified; and modifying the first power supply when both the total load of the one or more or more antenna arrays is below the first predetermined threshold and the load of the first QCI value is below the second predetermined threshold.

2. The system of claim 1, wherein the first QCI value is 1.

3. The system of claim 1, further comprising identifying a second QCI value, wherein the second QCI value is different from the first QCI value.

4. The system of claim 1, wherein the first antenna array comprises a first node and a second node.

5. The system of claim 4, wherein the first node comprises thirty two antenna elements.

6. The system of claim 4, wherein the first node is a gNodeB.

7. The system of claim 4, wherein second node is an eNodeB.

8. A method for dynamically allocating power in an antenna system, the method comprising:
   determining a maximum supply power available to the antenna system by a power supply component, wherein the antenna system comprises at least one antenna array comprising a first node and a second node, and wherein the first node and second node comprise a plurality of antenna elements;
   identifying a total load of the at least one antenna array of the antenna system;
   determining that the total load of the at least one antenna array is below a first predetermined threshold;
   upon determining that the total load of the at least one antenna array is below the first predetermined threshold, determining whether a load of a quality of service class identifier (QCI) value is below a second predetermined threshold;
   upon determining that the load of the QCI value is below the second predetermined threshold, determining that a power supply to the at least one antenna array should be modified; and
   dynamically modifying the power supply to the at least one antenna array when both the total load of the at least one antenna array is below the first predetermined threshold and the load of the QCI value is below the second predetermined threshold.

9. The method of claim 8, wherein the first node is a gNodeB.

10. The method of claim 8, further comprising identifying an updated load of the QCI value after expiration of a predetermined time period.

11. The method of claim 10, further comprising dynamically modifying the power supply to the at least one antenna upon determining that the updated load of the QCI value is below the second predetermined threshold.

12. The method of claim 8, wherein the maximum supply power available to the antenna system is 160 watts.

13. A method for dynamically allocating power in an antenna system, the method comprising:
   determining that a total load of at least one antenna array is below a first predetermined threshold;
   upon determining that the total load of the at least one antenna array is below the first predetermined threshold, determining that a load of a quality of service (QoS) class identifier (QCI) value for the at least one antenna array is below a second predetermined threshold;
   upon determining that the load of the QCI value is below the second predetermined threshold, determining that a power supply to the at least one antenna array should be modified;
   dynamically modifying the power supply to the at least one antenna array by a first predetermined level when both the total load of the at least one antenna array is below a first predetermined threshold and the load of the QCI value is below the second predetermined threshold, wherein the first predetermined level is less than a maximum power supply available to the antenna system;
   upon expiration of a predetermined time period, identifying an updated load of the QCI value;
   determining that the updated load of the QCI value is below the second predetermined threshold; and
   dynamically modifying the power supply to the at least one antenna array by a second predetermined level when both the total load of the at least one antenna array is below a first predetermined threshold and the updated load of the QCI value is below the second predetermined threshold, wherein the second predetermined level is less than the maximum power supply available to the antenna system.

14. The method of claim 13, the method further comprising:
   identifying a load of a second QCI value, wherein the second QCI value is different from the QCI value.

15. The method of claim 13, wherein the QCI value indicates a voice call.

16. The method of claim 13, wherein the first predetermined level is a reduction of at least 10%.

17. The method of claim 13, wherein the second predetermined level is greater than the first predetermined level.

18. The method of claim 13, further comprising prioritizing QCI values when more than one QCI value is detected.

19. The method of claim 18, wherein a QCI value indicating a voice call is prioritized higher than non-voice call QCI values.

* * * * *